(12) United States Patent
Shim et al.

(10) Patent No.: US 11,912,128 B2
(45) Date of Patent: Feb. 27, 2024

(54) DISPLAY DEVICE FOR VEHICLE

(71) Applicant: LG ELECTRONICS INC., Seoul (KR)

(72) Inventors: In Koo Shim, Gyeonggi-do (KR); Seunghwan Song, Seoul (KR); Romain Diboine, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 855 days.

(21) Appl. No.: 17/003,657

(22) Filed: Aug. 26, 2020

(65) Prior Publication Data

US 2021/0206266 A1 Jul. 8, 2021

(30) Foreign Application Priority Data

Jan. 8, 2020 (KR) .................. 10-2020-0002808

(51) Int. Cl.
*B60K 35/00* (2006.01)
*B60K 37/00* (2006.01)

(52) U.S. Cl.
CPC .............. *B60K 35/00* (2013.01); *B60K 37/00* (2013.01); *B60K 2370/1533* (2019.05); *B60K 2370/16* (2019.05); *B60K 2370/21* (2019.05)

(58) Field of Classification Search
CPC ............................... B60K 35/00; B60K 37/00; B60K 2370/1533; B60K 2370/16; B60K 2370/21; B60K 2370/158; B60K 2370/161; B60K 2370/165; B60K 2370/172; B60K 2370/174; B60K 2370/175; B60K 2370/1868; B60K 2370/1876; B60K 2370/195; B60K 2370/67; B60K 2370/682; B60K 37/02; B60K 2370/52; B60K 2370/73; B60K 2370/80; Y02T 10/84; B60R 1/00; B60R 16/02; B60R 2300/20; B60R 11/0235; B60R 2011/0003;
(Continued)

(56) References Cited

U.S. PATENT DOCUMENTS 10,317,948 B2 * 6/2019 Klug ..................... G06F 1/1652
2016/0193923 A1 7/2016 Kim et al.
2018/0079306 A1 3/2018 Kim et al.
(Continued)

FOREIGN PATENT DOCUMENTS

DE   102005017556   10/2006
DE   102014006338   11/2015
(Continued)

OTHER PUBLICATIONS

Extended European Search Report in European Appln. No. 20178752.0, dated Mar. 24, 2021, 14 pages.
(Continued)

*Primary Examiner* — Richard M Camby
(74) *Attorney, Agent, or Firm* — Fish & Richardson P.C.

(57) ABSTRACT

A display device for a vehicle includes a flexible display configured to be mounted in the vehicle. The display device is configured to extend and retract the flexible display to thereby change a size of a screen area of the flexible display. The display device may include a sensor configured to detect the size of the screen area, and a controller configured to, based on the size of the screen area, control a display state of information output through the flexible display.

20 Claims, 16 Drawing Sheets

(58) Field of Classification Search
CPC .. B60R 2300/10; G06F 3/0412; G06F 3/0488; G09F 9/301
See application file for complete search history.

(56) References Cited

U.S. PATENT DOCUMENTS

| | | | |
|---|---|---|---|
| 2019/0168611 A1 | 6/2019 | Helot et al. | |
| 2019/0189087 A1 | 6/2019 | Helot et al. | |
| 2021/0212221 A1* | 7/2021 | Diboine | H02K 7/06 |

FOREIGN PATENT DOCUMENTS

| | | |
|---|---|---|
| DE | 102015011403 | 3/2017 |
| DE | 102015011614 | 3/2017 |
| EP | 1637386 | 3/2006 |
| KR | 20090066014 | 6/2009 |
| KR | 1020100012945 | 2/2010 |
| KR | 1020110048705 | 5/2011 |
| KR | 20140058312 | 5/2014 |
| KR | 20170027163 | 3/2017 |
| KR | 1020170027163 | 3/2017 |
| KR | 20190063667 | 6/2019 |
| KR | 10-2041965 | 11/2019 |
| KR | 10-2019-0139645 | 12/2019 |

OTHER PUBLICATIONS

Office Action in Korean Appln. No. 10-2020-0002808, dated Dec. 16, 2021, 11 pages (with English translation).
EP partial European search report in European Appln. No. 20178752.0, dated Nov. 19, 2020, 14 pages.
Office Action in Korean Appln. No. 10-2020-0002808, dated Jun. 18, 2021, 11 pages (with English translation).

* cited by examiner

DISPLAY DEVICE FOR VEHICLE

CROSS-REFERENCE TO RELATED APPLICATION

This present application claims the benefit of priority to Korean Patent Application No. 10-2020-0002808, entitled "DISPLAY DEVICE FOR VEHICLE," filed on Jan. 8, 2020, the entire disclosure of which is incorporated herein by reference.

TECHNICAL FIELD

The present disclosure relates to a vehicle display device, and more particularly to a vehicle display device that can be mounted in an indoor space of a vehicle and configured to change a display area.

BACKGROUND

A vehicle may transport a user in a direction desired by the user. A car may be a representative example of the vehicle. In some cases, a vehicle may include various types of sensors and electronic devices for convenience of the user using the vehicle.

For example, a vehicle may include an Advanced Driver Assistance System (ADAS) for the driving convenience of a user. In some cases, a vehicle may perform autonomous driving.

In some examples, a vehicle may include displays disposed at various positions in the vehicle to display a variety of information such as vehicle-to-everything (V2X) information, and vehicle information. As the number of functions that an occupant can perform through a display increases for autonomous driving, various methods may control a display mounted in the vehicle.

In some cases, a display device mounted in the indoor space of a vehicle may be used to indicate information about the vehicle to persons located outside the vehicle or to other vehicles.

In some case, the vehicle display device may be a head-up display device for a vehicle.

Specifically, the head-up display device may include a sensor for sensing collision of a vehicle, a controller for operating an actuator in response to a sensing signal from the sensor, and a collision preventer supported by the actuator and configured to forcibly rotate a holder to guide insertion of a combiner into a case when a hinge is disengaged from the actuator under the control of the controller, thereby rapidly returning the combiner in the event of a collision of the vehicle so as to avoid a collision between the combiner and a driver.

The head-up display device may be configured to be rotatable at the installation position thereof so as to be changed to a closed state as needed, but may not change the shape of the vehicle display device according to various usage environments. For example, the head-up display device may not change the display area according to the needs of a user.

In some cases, a plurality of displays may be mounted in a vehicle in a substantially fixed manner and configured such that only the area of a screen on which an image is displayed is controlled differently depending on a current state of an occupant. The display device may not physically change the shape of a display device to optimize the display area according to the use environment.

SUMMARY

The present disclosure describes a vehicle display device configured such that, when the area of a display is changed according to the needs of a user, the information output through the display is automatically controlled so as to be optimally displayed.

The present disclosure also describes a vehicle display device configured such that the area of a display is automatically and optimally controlled according to the driving state of the vehicle.

The present disclosure further describes a vehicle display device configured to be automatically controlled so as to be optimally operated according to specific information input by a user in the vehicle.

Aspects of the present disclosure are not limited to the above-mentioned aspects, and other technical aspects not mentioned above will be clearly understood by those skilled in the art from the following description.

According to one aspect of the subject matter described in this application, a display device for a vehicle includes a flexible display configured to be mounted in the vehicle. The display device is configured to extend and retract the flexible display to thereby change a size of a screen area of the flexible display. The display device may include a sensor configured to detect the size of the screen area, and a controller configured to, based on the size of the screen area, control a display state of information output through the flexible display.

Implementations according to this aspect may include one or more of the following features. For example, the display device may include a non-transitory memory configured to store information to be output through the flexible display, where the controller may be configured to, based on the size of the screen area corresponding to a minimum area, control the flexible display to output first information selected from the information stored in the non-transitory memory.

In some implementations, the controller may be configured to control the flexible display to output a notification mark associated with second information that is stored in the non-transitory memory and is not displayed in the flexible display. In some implementations, the controller may be configured to, based on the size of the screen area being increased, control the flexible display to output the second information stored in the non-transitory memory.

According to another aspect, a display device includes a flexible display configured to be mounted in the vehicle, a sensor configured to detect a driving state of the vehicle, and a controller configured to control the flexible display to extend and retract to thereby change a size of a screen area of the flexible display based on the driving state.

Implementations according to this aspect may include one or more of the following features. For example, the controller may be configured to control the flexible display to increase the size of the screen area to a preset size or greater based on the driving state corresponding to a parking state. In some examples, the sensor may be configured to detect the parking state based on at least one of information input by a user in the vehicle, a traveling direction of the vehicle, a speed of the vehicle, or distribution of vehicles neighboring the vehicle.

In some implementations, the display device may include a camera configured to capture surrounding information of the vehicle, where the controller may be configured to, based on the size of the screen area being increased to the preset size or greater, control the flexible display to output the surrounding information in an image corresponding to an area photographed by the camera, the image having an enlarged aspect ratio corresponding to the increased size of the screen area.

In some implementations, the controller may be configured to, based on the size of the screen area being increased to the preset size or greater, control the flexible display to output the surrounding information in an image corresponding to an area photographed by the camera, the image having a constant aspect ratio across the flexible display.

In some implementations, the sensor may be configured to detect a driving speed of the vehicle, and the controller may be configured to control the size of the screen area based on the driving speed. In some examples, the controller may be configured to, based on the driving speed being greater than or equal to a preset speed, control the flexible display to reduce the size of the screen area to a minimum area and to output selected information in an image having a constant aspect ratio across the flexible display.

In some implementations, the controller may be configured to, based on the driving speed being greater than or equal to a preset speed, control the flexible display to maintain the size of the screen area and to output selected information in an image having an enlarged aspect ratio corresponding to the size of the screen area. In some examples, the controller may be configured to, based on the driving speed being less than a preset speed, control the flexible display to increase the size of the screen area to output additional information.

According to another aspect, a display device for a vehicle includes a flexible display configured to be mounted in the vehicle, and the display device is configured to extend and retract the flexible display to thereby change a size of a screen area of the flexible display. The display device further includes an input interface configured to receive information input by a user in the vehicle, an output interface configured to output information to the user in the vehicle, and a controller configured to control the flexible display based on the information received through the input interface.

Implementations according to this aspect may include one or more of the following features. For example, the display device may include a non-transitory memory configured to store registration information of the user of the vehicle, where the input interface is configured to receive user information input by the user in the vehicle. The controller may be configured to determine whether to activate operation of the flexible display based on a determination whether the user information matches the registration information.

In some implementations, the controller may be configured to, based on a determination that the user information matches the registration information, control the flexible display to extend and retract to thereby change the size of the screen area to a preset size. In some examples, the non-transitory memory may be configured to store registration information of a plurality of users of the vehicle, and the controller may be configured to control the flexible display according to individual registration information that matches the user information input by the user corresponding to one of the plurality of users.

In some implementations, the output interface may be disposed at a portion of the flexible display and configured to output a notification mark, and the input interface may be configured to receive, from the user, an authorization signal corresponding to the notification mark. The controller may be configured to control a display state of the information output through the flexible display based on whether the authorization signal is received through the input interface.

In some examples, the flexible display may be configured to display, in a first area of the flexible display, information selected by the user in the vehicle, and the controller may be configured to, in response to receiving the authorization signal corresponding to the notification mark, control the flexible display to increase the size of the screen area, and output additional information associated with the notification mark in a second area of the flexible display that is different from the first area.

In some examples, the flexible display may be configured to display information selected by the user in the vehicle, and the controller may be configured to, in response to receiving the authorization signal corresponding to the notification mark, control the flexible display to increase the size of the screen area, rearrange the selected information in the flexible display, and output additional information associated with the notification mark.

In some implementations, since the screen area of a flexible display is sensed by a sensor and the display state of information outputted through the flexible display is controlled by a controller based on the sensed screen area, it may be possible to optimally control the display state of information that is outputted when the screen area of the flexible display is changed.

In some implementations, when the screen area of the flexible display corresponds to the smallest area, only selected essential information may be displayed on the flexible display while additional information stored in a memory is not displayed on the flexible display. Accordingly, it may be possible to efficiently display information on the flexible display having a relatively small screen area.

In some implementations, since a notification mark associated with the additional information stored in the memory is outputted to the user in the vehicle, the user may be aware of the additional information that is not currently displayed due to the relatively small screen area of the flexible display.

In some implementations, when the screen area of the flexible display is increased, the additional information stored in the memory may be displayed on the flexible display. Accordingly, when the screen area of the flexible display is increased, the additional information may be automatically displayed without requiring the user to make a separate selection.

In some implementations, the driving state of the vehicle is sensed by the sensor, and the screen area of the flexible display may be adjusted by the controller based on the sensed driving state of the vehicle. Accordingly, the screen area of the flexible display may be optimally controlled so as to be changed to correspond to the driving state of the vehicle.

In some implementations, when it is sensed that the vehicle is in a parking mode, the screen area of the flexible display may be increased to a preset area or greater. Accordingly, the user may more easily confirm information related to parking of the vehicle.

In some implementations, whether the driving mode of the vehicle corresponds to the parking mode may be directly sensed through user input, or may be indirectly sensed based on various pieces of estimable information. Accordingly, the parking mode may be more effectively sensed, and the screen area of the flexible display may be increased to correspond thereto.

In some implementations, in response to the screen area of the flexible display being increased to a preset area or greater, surrounding information of the photographed area may be displayed on the flexible display at an enlarged aspect ratio. Accordingly, the user may receive more detailed and concrete information.

In some implementations, in response to the screen area of the flexible display being increased to a preset area or greater, surrounding information of a relatively large area photographed by a camera may be displayed on the flexible display at a constant aspect ratio. Accordingly, the user may confirm a large amount and variety of pieces of information on a relatively large area.

In some implementations, where the driving speed of the vehicle is sensed, the screen area of the flexible display may be controlled based on the sensed driving speed. Accordingly, it may be possible to secure driving safety by changing the screen area of the flexible display according to the driving speed of the vehicle.

In some implementations, in response to the driving speed of the vehicle being equal to or greater than a preset speed, the screen area of the flexible display may be reduced to the smallest area, and only selected information may be displayed on the flexible display at a constant aspect ratio. Accordingly, the user may concentrate solely on information directly related to driving of the vehicle in a situation evaluated to be relatively dangerous due to high-speed driving.

In some implementations, in response to the driving speed of the vehicle being equal to or greater than a preset speed, the screen area of the flexible display may be maintained at the current area, and only selected information may be displayed on the flexible display at an enlarged aspect ratio. Accordingly, the user may more easily receive information directly related to driving of the vehicle in a situation evaluated to be relatively dangerous due to high-speed driving.

In some implementations, in response to the driving speed of the vehicle being below a preset speed, the screen area of the flexible display may be increased, and additional information may be displayed on the flexible display. Accordingly, it may be possible to provide a greater variety of pieces of information to the user in a situation evaluated to be relatively safe due to low-speed driving.

In some implementations, when specific information is inputted through an input interface by the user, the operation of the flexible display may be controlled by the controller based on the input information. Accordingly, the operation of the vehicle display device may be optimally controlled based on the specific intention of the user.

In some implementations, the decision of whether to activate the operation of the flexible display may be made depending on whether user information matches the registration information. Accordingly, only an authenticated user is allowed to operate the vehicle display device.

In some implementations, when user information matches the registration information, the screen area of the flexible display may be changed to a preset area. Accordingly, the flexible display may be optimally controlled so as to be used immediately when an authentication process is successful without requiring the user to manually operate the device.

In some implementations, the flexible display may be individually controlled according to each piece of registration information that matches the user information that is inputted. Accordingly, the flexible display may be optimally controlled so as to be used immediately in consideration of the characteristics of each of a plurality of users.

In some implementations, the display state of information that is outputted through the flexible display may be controlled depending on whether the user has applied input of an authorization signal in response to a notification mark outputted to the user. Accordingly, information to which the user is likely to pay attention may be more frequently provided to the user.

In some implementations, in response to the user applying input to the notification mark, the screen area of the flexible display may be increased, and additional information associated with the notification mark may be additionally displayed in an area other than the area in which selected information is displayed. Accordingly, when the additional information is displayed, the selected information may be continuously and stably provided to the user.

In some implementations, in response to the user applying input to the notification mark, the screen area of the flexible display may be increased, and additional information associated with the notification mark and the existing selected information may be rearranged and displayed. Accordingly, all or some pieces of information including the additional information may be optimally displayed.

Further scope of applicability of the present disclosure will be apparent from the above detailed description. It should be understood, however, that specific examples, such as the detailed description and the example implementations of the present disclosure, are given by way of illustration only, since various changes and modifications within the spirit and scope of the present disclosure will become apparent to those skilled in the art.

BRIEF DESCRIPTION OF THE DRAWINGS

The above and other aspects, features, and advantages of the present disclosure will become apparent from the detailed description of the following aspects in conjunction with the accompanying drawings.

DETAILED DESCRIPTION

Figure 1:
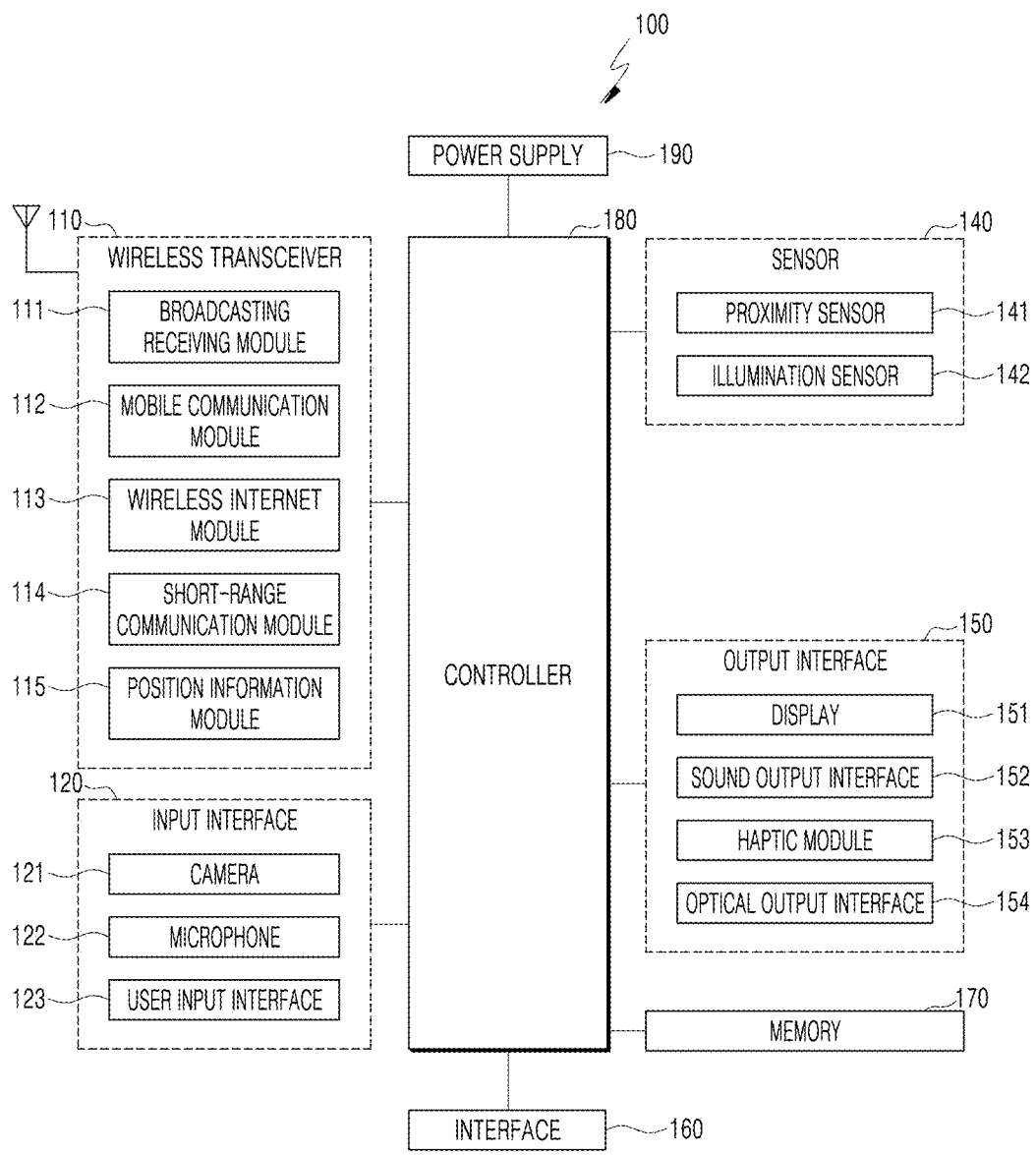
FIG. 1 is a block diagram illustrating an example of a vehicle display device.

Hereinafter, one or more implementations of the present disclosure will be described in detail with reference to accompanying drawings, and the same or similar elements are designated with the same numeral references regardless of numerals in the drawings and their redundant description will be omitted. The accompanying drawings are merely used to help easily understand implementations of the present disclosure, and it should be understood that the technical idea of the present disclosure is not limited by the accompanying drawings, and these implementations include all changes, equivalents or alternatives within the idea and the technical scope of the present disclosure.

FIG. 1 is a block diagram showing an example of a vehicle display device 100.

In some implementations, the vehicle display device 100 may include a wireless transceiver 110, an input interface 120, a sensor 140, an output interface 150, an interface 160, a memory 170, a controller 180, and a power supply 190. In some implementations, the vehicle display device may include more or fewer components than the components illustrated in FIG. 1.

More specifically, the wireless transceiver 110 may include one or more modules which enable wireless communication between the vehicle display device 100 and a wireless communication system, between the vehicle display device 100 and another vehicle display device 100, or between the vehicle display device 100 and an external server. Further, the wireless transceiver 110 may include one or more modules which connect the vehicle display device 100 to one or more networks.

The wireless transceiver 110 may include at least one of a broadcasting receiving module 111, a mobile communication module 112, a wireless Internet module 113, a short-range communication module 114, or a position information module 115.

The input interface 120 may include a camera 121 or an image input interface which receives input of an image signal, a microphone 122 or an audio input interface which receives input of an audio signal, and a user input interface 123 (for example, a touch key or a mechanical key) which receives information from a user. Voice data or image data collected by the input interface 120 is analyzed and processed as a control command of the user.

The sensor 140 may include one or more sensors which sense at least one of information in the vehicle display device, surrounding environment information around the vehicle display device, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121 or a microphone 122), a battery gauge, an environment sensor (for example, a barometer, a hygrometer, a thermometer, a radiation sensor, a thermal sensor, and a gas sensor), or a chemical sensor (for example, an electronic nose, a healthcare sensor, and a biometric sensor). Further, the vehicle display device disclosed in the present specification may combine and utilize information sensed by at least two sensors from the above-mentioned sensors.

The output interface 150 generates outputs related to visual, auditory, or tactile senses, and may include at least one of a display 151, a sound output interface 152, a haptic module 153, or an optical output interface 154. The display 151 may be configured as a touch screen by forming a mutual layered structure with a touch sensor or being formed integrally therewith. The touch screen may simultaneously serve as a user input interface 123 for providing an input interface between the vehicle display device 100 and the user and an output interface between the vehicle display device 100 and the user.

The interface 160 serves as a passage between various types of external devices which are connected to the vehicle display device 100. The interface 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The vehicle display device 100 may perform appropriate control related to the connected external device in accordance with the connection of the external device to the I/O connector or interface 160.

Further, the memory 170 may store data which supports various functions of the vehicle display device 100. The memory 170 may store a plurality of application programs or applications that are driven by the vehicle display device 100, data for operating the vehicle display device 100, and instructions. At least some of the application programs may be downloaded via an external server through wireless communication. Further, at least some of the application programs, related to basic functions of the vehicle display device 100 (for example, incoming and outgoing call functions, and message receiving and sending functions), may be installed in the vehicle display device 100 from the time of release. The application programs are stored in the memory 170, and are installed in the vehicle display device 100 and driven by the controller 180 to perform operations (or functions) of the vehicle display device.

In addition to the operations related to the application programs, the controller 180 may generally control the overall operation of the vehicle display device 100. The controller 180 may process signals, data, or information which is inputted or outputted through the above-described components, or drive the application programs stored in the memory 170 to provide or process appropriate information or functions to the user.

Further, in order to drive the application program stored in the memory 170, the controller 180 may control at least some of the components described with reference to FIG. 1. Moreover, the controller 180 may combine and operate at least two of the components included in the vehicle display device 100 to drive the application program. For example, the controller 180 may include one or more processors, a computer, an electric circuit, a microprocessor, or the like.

The power supply 190 receives application of external power, and supplies the power to the respective components included in the vehicle display device 100 under the control of the controller 180. At least some of the above-described components may operate in cooperation with each other to implement the operation, the control, or the control method of the vehicle display device according to various embodiments, which will be described below. Further, the operation, the control, or the control method of the vehicle display device may be implemented in the vehicle display device by driving at least one application program stored in the memory 170.

Hereinafter, prior to describing various examples of the vehicle display device 100 described above, the above-mentioned components will be described in more detail with reference to FIG. 1.

The wireless transceiver 110 will be described below. The broadcasting receiving module 111 of the wireless transceiver 110 receives a broadcasting signal and/or broadcasting-related information from an external broadcasting management server through a broadcasting channel. The broadcasting channel may include a satellite channel and a ground wave channel. Two or more broadcasting receiving modules for simultaneous broadcasting reception or broadcasting channel switching for at least two broadcasting channels may be provided in the vehicle display device 100.

The broadcasting management server may refer to a server which generates and transmits a broadcasting signal and/or broadcasting-related information, or a server which is supplied with a previously generated broadcasting signal and/or broadcasting-related information and transmits the broadcasting signal and/or the broadcasting-related information to the vehicle display device. The broadcasting signal includes not only a TV broadcasting signal, a radio broadcasting signal, and a data broadcasting signal, but also a broadcasting signal obtained by combining a TV broadcasting signal or a radio broadcasting signal with a data broadcasting signal.

The broadcasting signal may be encoded according to at least one technical standard for transmitting and receiving a digital broadcasting signal (or broadcasting schemes, for example, ISO, IEC, DVB, or ATSC), and the broadcasting receiving module 111 may receive the digital broadcasting signal using an appropriate method for the technical specification determined by the technical standard.

The broadcasting-related information may refer to information related to a broadcasting channel, a broadcasting program, or a broadcasting service provider. The broadcasting-related information may also be provided through the mobile communication network. In some cases, the broadcasting-related information may be received by the mobile communication module 112.

The broadcasting-related information may exist in various types such as an electronic program guide of digital multimedia broadcasting (DMB) or an electronic service guide of a digital video broadcast-handheld (DVB-H). The broadcasting signal and/or the broadcasting-related information received by the broadcasting receiving module 111 may be stored in the memory 170.

The mobile communication module 112 may include a modem that may transmit/receive a wireless signal to/from at least one among a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various types of data in accordance with transmission or reception of a text/multimedia message.

The wireless Internet module 113 refers to a module for wireless Internet access and may be built in or external to the vehicle display device 100. The wireless Internet module 113 may be configured to transmit/receive a wireless signal in a communication network according to wireless Internet technologies.

Wireless Internet technologies may include wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit or receive data in accordance with at least one of the wireless Internet technologies or other types of Internet technologies.

From the viewpoint that the wireless Internet connection by WiBro, HSDPA, HSUPA, GSM, CDMA, WCDMA, LTE, LTE-A, etc. is performed through a mobile communication network, the wireless Internet module 113 which performs the wireless Internet connection through the mobile communication network may be understood as a type of the mobile communication module 112.

The short-range communication module 114 may support short-range communication using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The short-range communication module 114 may support wireless communication between the vehicle display device 100 and the wireless communication system, between the vehicle display device 100 and another vehicle display device 100, or between the vehicle display device 100 and a network in which the other vehicle display device 100 (or external server) is located, through a short-range wireless communication network. The short-range wireless communication network may be a short-range wireless personal communication network.

The position information module 115 may include a Global Navigation Satellite System (GNSS) sensor that is configured to obtain the location (or the current location) of a vehicle display device, and its representative examples include a global positioning system (GPS) module or a Wi-Fi module. For example, when a GPS module is utilized, the vehicle display device may obtain the position of the vehicle display device using a signal transmitted from a GPS satellite. As another example, when a Wi-Fi module is utilized, the vehicle display device may obtain the position of the vehicle display device based on information of a wireless access point (AP) which transmits and receives wireless signals with the Wi-Fi module. In some cases, the position information module 115 may perform a function of another module of the wireless transceiver 110 to alternatively or additionally obtain data on the position of the vehicle display device. As a module used to obtain a position (or a current position) of the vehicle display device, the position information module 115 is not limited to a module which directly calculates or obtains the position of the vehicle display device.

In some examples, the input interface 120 may be configured to input video information (or signals), audio information (or signals), data, or information inputted from the user. In order to receive input of video information, the vehicle display device 100 may include one or more cameras 121. The camera 121 processes an image frame such as a still image or a moving image obtained by an image sensor in a video call mode or a photographing mode. The processed image frames may be displayed on the display 151 or stored in the memory 170. Further, the plurality of cameras 121 equipped in the vehicle display device 100 may be disposed to form a matrix structure, and a plurality of pieces of image information having various angles or focal points may be inputted to the vehicle display device 100 through the cameras 121 that form the matrix structure. Further, the cameras 121 may be disposed to have a stereo structure to obtain a left image and a right image to implement a stereoscopic image.

The microphone 122 processes an external sound signal as electronic voice data. The processed voice data may be utilized in various forms in accordance with a function being performed by the vehicle display device 100 (or an application program which is being executed). In some examples, the microphone 122 may implement various noise removal algorithms to remove noise generated during the process of receiving the external sound signal.

The user input interface 123 receives information from the user, and when the information is inputted through the user input interface 123, the controller 180 may control the operation of the vehicle display device 100 so as to correspond to the inputted information. In some implementations, the user input interface 123 may include a mechanical input interface (or a mechanical key, for example, a button located on a front, rear, or side surface of the vehicle display device 100, a dome switch, a jog wheel, a jog switch, or the like) and a touch type input interface. In some implementations, the touch type input interface may include a graphical key, a virtual key, a soft key, or a visual key displayed on the touch screen via a software process, or may include a touch key disposed on a portion other than the touch screen. The virtual key or the visual key may be displayed on the touch screen in various shapes, and for example, may be formed by graphics, text, icons, video, or a combination thereof.

The sensor 140 senses at least one of information in the vehicle display device, surrounding environment information around the vehicle display device, or user information, and generates a sensing signal corresponding to the information. The controller 180 may control the driving or the operation of the vehicle display device 100 or perform data processing, functions, or operations related to the application programs installed in the vehicle display device 100, based on the sensing signal. Representative sensors among the various sensors which may be included in the sensor 140 will be described in more detail below.

First, the proximity sensor 141 is a sensor which senses the presence of an object approaching a predetermined sensing surface or nearby objects, using an electromagnetic field force or infrared ray without any mechanical contact. The proximity sensor 141 may be disposed in an internal area of the vehicle display device, which is enclosed by the above-described touch screen, or in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect the proximity of the object with a change in the electric field in accordance with the proximity of the object having conductivity. In some cases, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch". A position at which the object proximately touches the touch screen refers to a position at which the object vertically corresponds to the touch screen when the object proximately touches the touch screen. The proximity sensor 141 may sense a proximate touch and a proximate touch pattern (for example, a proximate touch distance, a proximate touch direction, a proximate touch speed, a proximate touch time, a proximate touch position, a proximate touch movement state, etc.). As described above, the controller 180 may process data (or information) corresponding to the proximate touch operation and the proximate touch pattern sensed by the proximity sensor 141, and may further output visual information corresponding to the processed data on the touch screen. Furthermore, the controller 180 may control the vehicle display device 100 to process different operations or data (or information) depending on whether the touch on the same point on the touch screen is a proximity touch or a contact touch.

The touch sensor senses a touch (or a touch input) applied to the touch screen (or the display 151) using at least one of various touch types such as a resistive film type, a capacitive type, an infrared type, an ultrasonic type, and a magnetic field type.

For example, the touch sensor may be configured to convert a change of a pressure which is applied to a specific portion of the touch screen, or a capacitance which is generated in a specific portion, into an electrical input signal. The touch sensor may be configured to detect a position and an area where a touch subject which applies a touch onto the touch screen is touched on the touch sensor, and a capacitance at the time of the touch. Here, the touch subject is an object which applies a touch to the touch sensor, and may include, for example, a finger, a touch pen, a stylus pen, and a pointer.

As described above, when there is a touch input to the touch sensor, corresponding signals are transmitted to a touch controller. The touch controller processes the signal(s) and then transmits corresponding data to the controller 180. By doing this, the controller 180 may confirm which area of the display 151 is touched. Here, the touch controller may be a separate component from the controller 180, or may be the controller 180 itself.

The controller 180 may perform different control or the same control depending on a type of a touch subject which touches the touch screen (or a touch key equipped other than the touch screen). Whether to perform the different control or the same control depending on the type of touch subject may be determined in accordance with an operating state of the vehicle display device 100 or an application program which is being executed.

The touch sensor and proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object using an ultrasonic wave. The controller 180 may calculate a position of a wave generating source by information sensed by the optical sensor and the plurality of ultrasonic sensors. A position of the wave generating source may be calculated using the property that light is much faster than an ultrasonic wave, that is, the time in which light reaches the optical sensor is much faster than the time in which the ultrasonic wave reaches the ultrasonic sensor. More specifically, the position of the wave generating source may be calculated using a time difference of the time of arrival of the ultrasonic wave with respect to light which serves as a reference signal.

As seen from the configuration of the input interface 120, the camera 121 includes at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor, which is laminated on a display element, is configured to scan a motion of a sensing object proximate to the touch screen. More specifically, the photo sensor is formed by mounting photo diodes and transistors (TR) in rows/columns to scan contents which are disposed on the photo sensor using an electrical signal that changes in accordance with an amount of light applied to the photo diode. That is, the photo sensor calculates coordinates of a sensing object in accordance with a changed amount of light, and position information of the sensing object may be obtained through the coordinates.

The display 151 displays (outputs) information processed in the vehicle display device 100. For example, the display 151 may display execution screen information of an application program driven in the vehicle display device 100 and user interface (UI) and graphic user interface (GUI) information in accordance with the execution screen information.

Further, the display 151 may be configured as a stereoscopic display which displays a stereoscopic image.

A three-dimensional display type such as a stereoscopic type (a glass type), an autostereoscopic type (a glass-free type), a projection type (a holographic type) may be applied to the stereoscopic display.

The sound output interface 152 may include a speaker that may output audio data received from the wireless transceiver 110 or stored in the memory 170 in a call signal reception mode, a phone-call mode, a recording mode, a speech recognition mode, or a broadcasting reception mode. The sound output interface 152 may also output a sound signal related to a function (for example, a call signal reception sound or a message reception sound) performed in the vehicle display device 100. The sound output interface 152 may include, for example, a receiver, a speaker, and a buzzer.

The haptic module 153 may generate various tactile effects that can be felt by the user. A representative example of the tactile effect generated by the haptic module 153 may be vibration. For instance, the haptic module 153 may include an actuator configured to generate vibration. An intensity and a pattern of the vibration generated in the haptic module 153 may be controlled by the selection of the user or a setting of the controller 180. For example, the haptic module 153 may compose different vibrations to output the composed vibrations, or sequentially output the different vibrations.

In addition to vibration, the haptic module 153 generates various tactile effects such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect by means of direct contact, but may also be implemented to allow the user to feel a tactile effect by muscular sensation of a finger or an arm. Two or more haptic modules 153 may be provided in accordance with a configuration aspect of the vehicle display device 100.

The optical output interface 154 outputs a signal for notifying occurrence of an event using light of a light source of the vehicle display device 100. Examples of events generated in the vehicle display device 100 may be message reception, call signal reception, missed call, alarm, schedule notification, email reception, and information reception through an application.

The signal outputted from the optical output interface 154 is implemented as the vehicle display device emits single color or a plurality of color light to a front surface or a rear surface. When the vehicle display device senses the event confirmation of the user, the signal output may be completed.

The interface 160 serves as a passage with all external devices which are connected to the vehicle display device 100. The interface 160 receives data from the external device or is supplied with the power source to transmit the power source to each component in the vehicle display device 100, or transmits data in the vehicle display device 100 to the external device. For example, the interface 160 may include a wired/wireless headset port, an external charger port, a wired/wireless data port, a memory card port, a port which connects a device equipped with an identification module, an audio input/output (I/O) port, a video input/output (I/O) port, an earphone port, etc.

In some implementations, the identification module may include an electric circuit or device, for example, a chip in which various information for authenticating a usage right of the vehicle display device 100 is stored and includes a user identification module (UIM), a subscriber identification module (SIM), and a universal subscriber identity module (USIM). A device with an identification module (hereinafter, "identification device") may be manufactured as a smart card. Therefore, the identification device may be connected to the terminal through the I/O connector or interface 160.

The memory 170 may store a program for an operation of the controller 180, or temporarily store input/output data (for example, a phone book, a message, a still image, a moving image, etc.). The memory 170 may store data on a vibration or a sound of various patterns output when the touch is inputted onto the touch screen.

The memory 170 may include at least one type of non-transitory storage medium of a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The vehicle display device 100 may operate in association with a web storage which performs a storage function of the memory 170 on the Internet.

As described above, the controller 180 may control an operation related to the application program and an overall operation of the vehicle display device 100. For example, when the state of the vehicle display device satisfies a predetermined condition, the controller 180 may execute or release a locking state which restricts an input of a control command of a user for the applications.

Further, the controller 180 may perform control and processing related to voice call, data communication, and video call, or perform a pattern recognition process which recognizes a handwriting input or a picture drawing input performed on the touch screen as a text or an image, respectively. Moreover, the controller 180 may control any one or a combination of a plurality of components described above to implement various embodiments which will be described below on the vehicle display device 100.

The display 151 may display (output) information processed in the vehicle display device 100. For example, the display 151 may display execution screen information of an application program driven in the vehicle display device 100 and user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a three-dimensional display (3D display), an electronic ink display (e-ink display), or other types of flexible displays.

In some implementations, two or more displays 151 may be provided in accordance with an implementation type of the vehicle display device 100. In some examples, a plurality of displays may be disposed to be spaced apart from each other or integrally disposed on one surface of the vehicle display device 100 or may be disposed on different surfaces.

The display 151 may include a touch sensor which senses a touch on the display 151 so as to receive the control command by the touch method. Therefore, when the touch is made on the display 151, the touch sensor senses the touch, and based on the touch the controller 180 generates a control command corresponding to the touch. Contents inputted by the touch method may be letters or numbers, instructions in various modes, menu items which may be designated, or the like.

The microphone 122 may be configured to receive a voice of the user, or other sounds. The microphone 122 is equipped in a plurality of locations to receive stereo sounds.

The interface 160 may provide a passage through which the vehicle display device 100 may connect to an external device. For example, the interface 160 may be at least one of a connection terminal for connection with other devices (for example, an earphone or an external speaker), a port for short-range communication (for example, an infrared port (IrDA port), a Bluetooth port, a wireless LAN port, etc.), or a power supply terminal for supplying a power to the vehicle display device 100. The interface 160 may be implemented as a socket type which accommodates an external card such as a subscriber identification module (SIM), a user identity module (UIM), and a memory card for information storage.

At least one antenna for wireless communication may be provided in a terminal body. The antenna may be embedded in the terminal body or formed in a case. For example, the antenna which forms a part of the broadcasting receiving module 111 (see FIG. 1) may be configured to be drawn from the terminal body. Alternatively, the antenna may be formed as a film type to be attached onto an inner surface of a housing, or a case including a conductive material may serve as an antenna.

Figure 2:
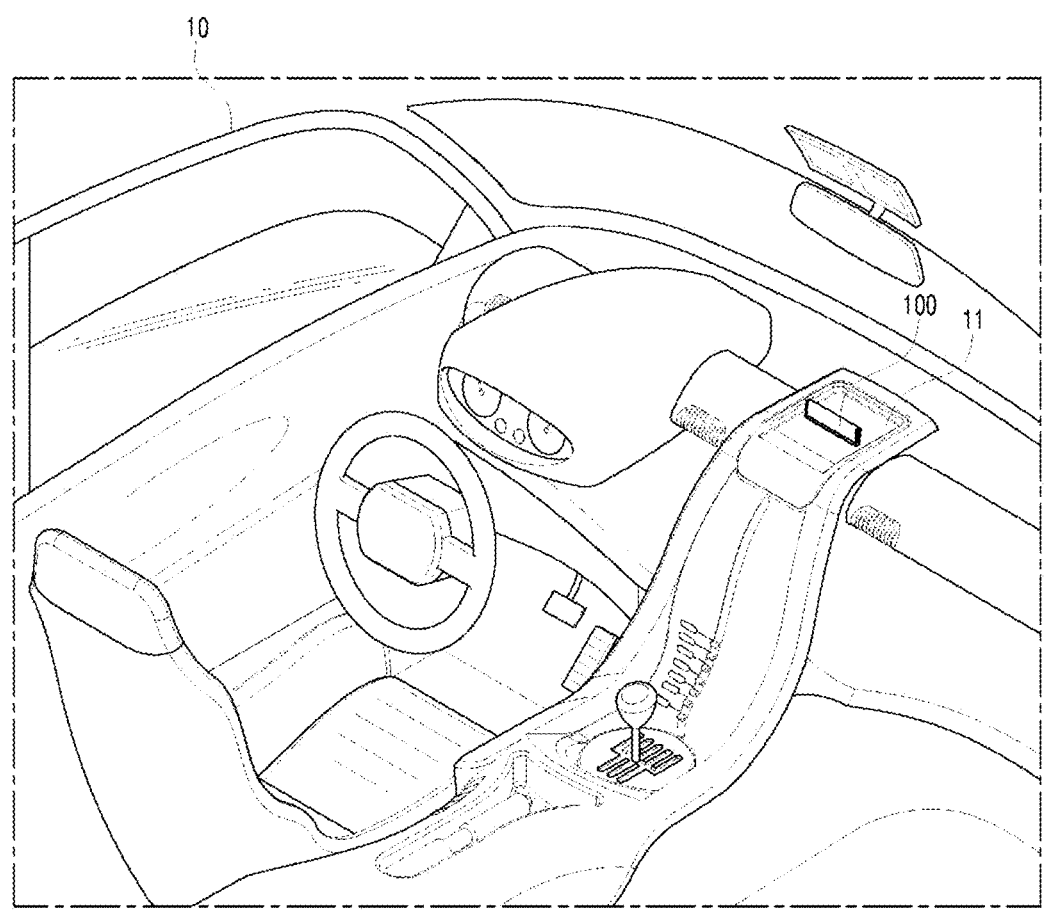
FIG. 2 is a view showing an example state of an example vehicle display device mounted in a vehicle.
Figure 3:
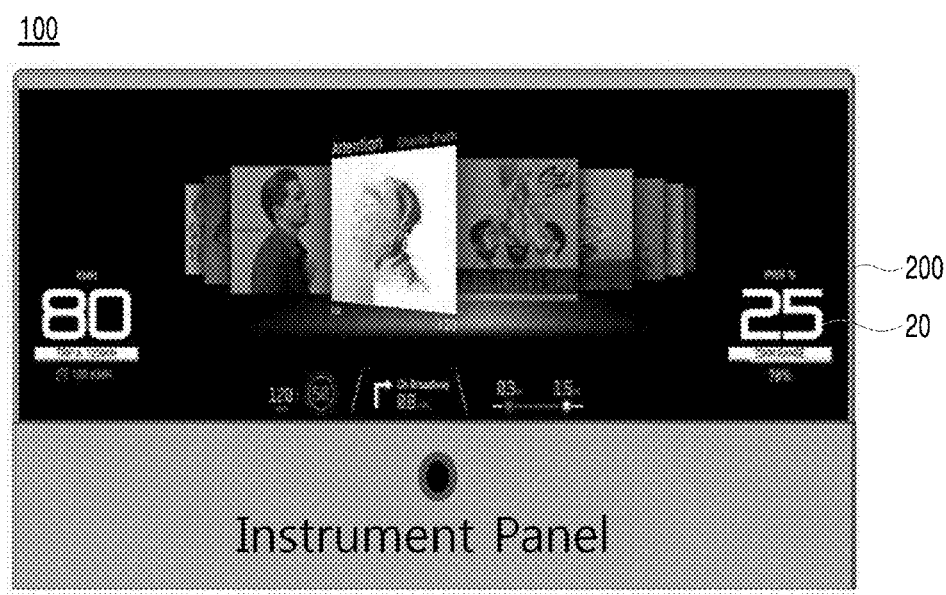
FIGS. 3 and 4 are views showing examples of operation of the vehicle display device.
Figure 4:
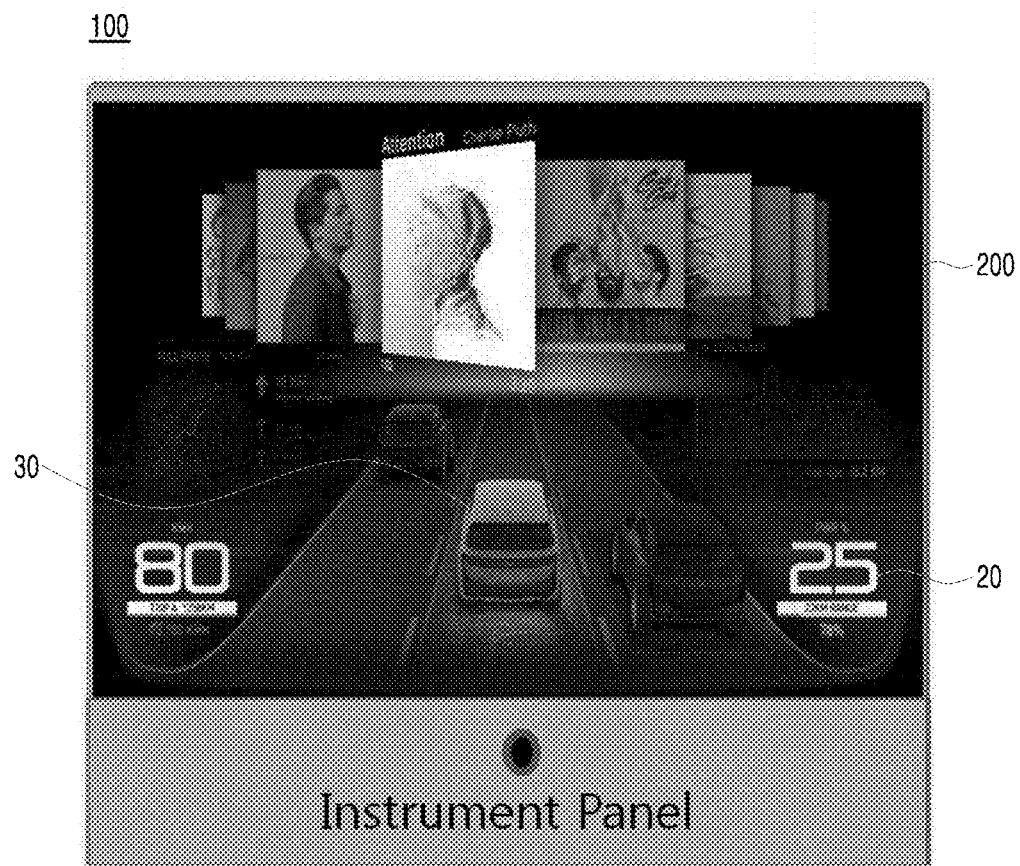

FIG. 2 is a view showing an example state of an example vehicle display device mounted in a vehicle. FIGS. 3 and 4 are views showing examples of operation of the vehicle display device.

As shown in FIGS. 2 to 4, the vehicle display device 100 may be mounted on an interior member 11 of a vehicle 10 and configured such that the area of a display is changeable. In some implementations, the vehicle display device 100 may include a flexible display 200, a sensor 140, and a controller 180.

The flexible display 200 may be mounted in the indoor space of the vehicle 10, and may be formed such that the screen area thereof is changeable. For example, the flexible display 200 may extend from a first position to a second position, and may retract from the second position to the first position to thereby change a size of the screen area. The screen area of the flexible display 200 may be adjusted according to, for example, the choice of a user, the state of the vehicle 10, or the external environment.

In some cases, the user may desire to obtain various pieces of information through a relatively large screen. In some examples, the user may first increase the screen area of the flexible display 200, and may then perform manipulation so that information such as driving information of the vehicle 10, surrounding environment information, and information on the content that the user is viewing or listening to are displayed on the flexible display 200.

In some examples, in order to concentrate more on driving, the user may perform manipulation such that only essential information 20, such as driving information of the vehicle 10, is displayed on the flexible display 200 by minimizing the screen area of the flexible display 200. This is because it is increasingly likely that the field of vision of the user will be blocked and the user will be distracted when the screen area of the flexible display 200 is large.

Accordingly, the user may reduce the size of the screen area of the flexible display 200 such that only driving information of the vehicle 10 is displayed thereon.

The sensor 140 may sense the size of the screen area of the flexible display 200, and may sense a change in the screen area of the flexible display 200 through the process described above.

The controller 180 may control the display state of information outputted through the flexible display 200 according to the sensed screen area of the flexible display 200. For example, the controller 180 may control at least one of a kind, an amount, or a size of the information that is outputted.

As described above, in the vehicle display device 100, since the screen area of the flexible display 200 is sensed by the sensor 140 and the display state of information outputted through the flexible display 200 is controlled by the controller 180 based on the sensed screen area, it may be possible to optimally control the display state of information that is outputted when the screen area of the flexible display 200 is changed.

The vehicle display device 100 may further include a memory 170 capable of storing information outputted through the flexible display 200. In response to the screen area of the flexible display 200 corresponding to the smallest area, The controller 180 may cause only selected essential information 20 to be displayed on the flexible display 200 and additional information 30, which is not displayed on the flexible display 200, to be stored in the memory 170.

In some implementations, as shown in FIG. 3, when it is sensed that the screen area of the flexible display 200 corresponds to the smallest area, only essential information 20 may be displayed on the flexible display 200.

For instance, the essential information 20 may refer to information that is set in advance by a user or a manufacturer of the device. The essential information 20 may be information that is directly related to the driving of the vehicle 10, such as a driving speed or a driving route of the vehicle 10.

The additional information 30 refers the remaining information that is not essential information 20. The additional information 30 may be information that is not directly related to the driving of the vehicle 10, such as surrounding environment information, or may be information related to tastes or interests of a user, such as the content that the user is viewing or listening to.

As described above, in the vehicle display device 100, when the screen area of the flexible display 200 corresponds to the smallest area, only selected essential information 20 is displayed on the flexible display 200, and the additional information 30, which is not displayed on the flexible display 200, is stored in the memory 170. Accordingly, it may be possible to efficiently display information on the flexible display 200 having a relatively small screen area.

In the vehicle display device 100, the controller 180 may cause a notification mark 50 associated with the additional information 30 stored in the memory 170 to be outputted to the user in the vehicle 10.

In some examples, the controller 180 may notify the user that there is information that is to be additionally displayed in response to the screen area of the flexible display 200 increasing, enabling the user to select whether to increase the screen area of the flexible display 200.

In some examples, when the user desires to confirm the information to be additionally displayed, the user may perform a manipulation of increasing the screen area of the flexible display 200. In some cases, when the user is not interested in the information being additionally displayed, the user may not change the screen area of the flexible display 200.

As described above, in the vehicle display device 100, since the notification mark 50 associated with the additional information 30 stored in the memory 170 is outputted to the user in the vehicle 10, the user may be aware that there is additional information 30 that is not currently being displayed due to the relatively small screen area of the flexible display 200.

In the vehicle display device 100, the controller 180 may cause the additional information 30 stored in the memory 170 to be displayed on the flexible display 200 when the screen area of the flexible display 200 is increased.

As described above, the user who is aware of the presence of the notification mark 50 may increase the screen area of the flexible display 200 in order to confirm the additional information 30 associated with the notification mark 50. In some examples, the additional information 30 may be output immediately upon enlarging the screen in order to increase user convenience.

As such, in the vehicle display device 100, when the screen area of the flexible display 200 is increased, the additional information 30 stored in the memory 170 is displayed on the flexible display 200. Accordingly, when the screen area of the flexible display 200 is increased, the additional information 30 may be automatically displayed without requiring the user to make a separate selection.

FIGS. 5 to 8 are views showing examples of operation of an example vehicle display device.

For example, the vehicle display device 102 may include a flexible display 200, a sensor 140 and a controller 180.

The sensor 140 senses the driving state of the vehicle 10, and the controller 180 controls the flexible display 200 such that the screen area of the flexible display 200 is adjusted based on the sensed driving state of the vehicle 10.

That is, the above-described change in the screen area of the flexible display 200 may be appropriately controlled according to the driving state of the vehicle 10 without requiring the user to manually operate the device.

As described above, in the vehicle display device 102, the driving state of the vehicle 10 is sensed by the sensor 140, and the screen area of the flexible display 200 is adjusted by the controller 180 based on the sensed driving state of the vehicle 10. Accordingly, the screen area of the flexible display 200 may be optimally controlled so as to be changed corresponding to the driving state of the vehicle 10.

In the vehicle display device 102, the sensor 140 may sense that the driving state of the vehicle 10 is a parking mode, and the controller 180 may control the flexible display 200 such that the screen area thereof is increased to a preset area or greater according to the sensed parking mode.

Figure 5:
FIGS. 5 to 8 are views showing examples of operation of an example vehicle display device.
Figure 6:
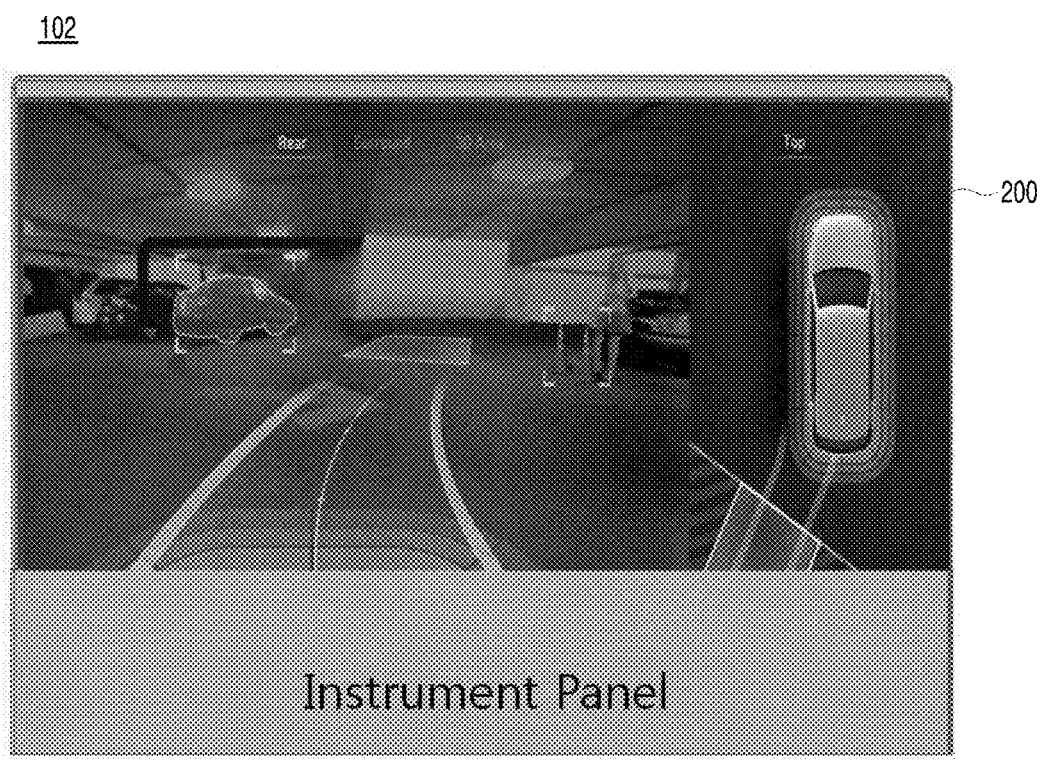

That is, as shown in FIG. 5, when the parking mode is sensed in the state in which the screen area of the flexible display 200 is smallest, the screen area of the flexible display 200 may be increased so that various pieces of information related to parking are displayed, as shown in FIG. 6.

Therefore, the user may park the vehicle 10 while confirming various pieces of information related to parking of the vehicle 10 through the flexible display 200 without performing a separate manipulation of enlarging the screen.

As described above, in the vehicle display device 102, when it is sensed that the vehicle 10 is in the parking mode, the screen area of the flexible display 200 is increased to a preset arear or greater. Accordingly, the user may more easily confirm information related to parking of the vehicle 10.

In the vehicle display device 102, the sensor 140 may directly sense parking mode information that is inputted by the user in the vehicle 10, or may indirectly sense parking mode information through the traveling direction of the vehicle 10, the speed of the vehicle 10, and the distribution of neighboring vehicles.

That is, the above-described parking mode may be sensed based on parking mode information inputted by the user. For example, the user may directly input parking mode information by pressing or touching a separate parking mode button installed in the vehicle 10.

Alternatively, the parking mode may be indirectly sensed based on the state of the vehicle 10 without separate input by the user. For example, in response to it being sensed that the vehicle 10 is put in the reverse gear and that there is a parking line in the area to which the vehicle 10 is to be reversed, it may be estimated that the driving mode of the vehicle 10 corresponds to the parking mode.

As described, in the vehicle display device 102, whether the driving mode of the vehicle 10 corresponds to the parking mode is directly sensed through user input, or is indirectly sensed based on various pieces of estimable information. Accordingly, the parking mode may be more effectively sensed, and the screen area of the flexible display 200 may be increased corresponding thereto.

The vehicle display device 102 may further include a camera 121 capable of capturing an image of the surroundings of the vehicle 10. In response to the screen area of the flexible display 200 being increased to a preset area or greater, the controller 180 may cause the surrounding information of the photographed area to be displayed on the flexible display 200 at an enlarged aspect ratio.

Figure 7:
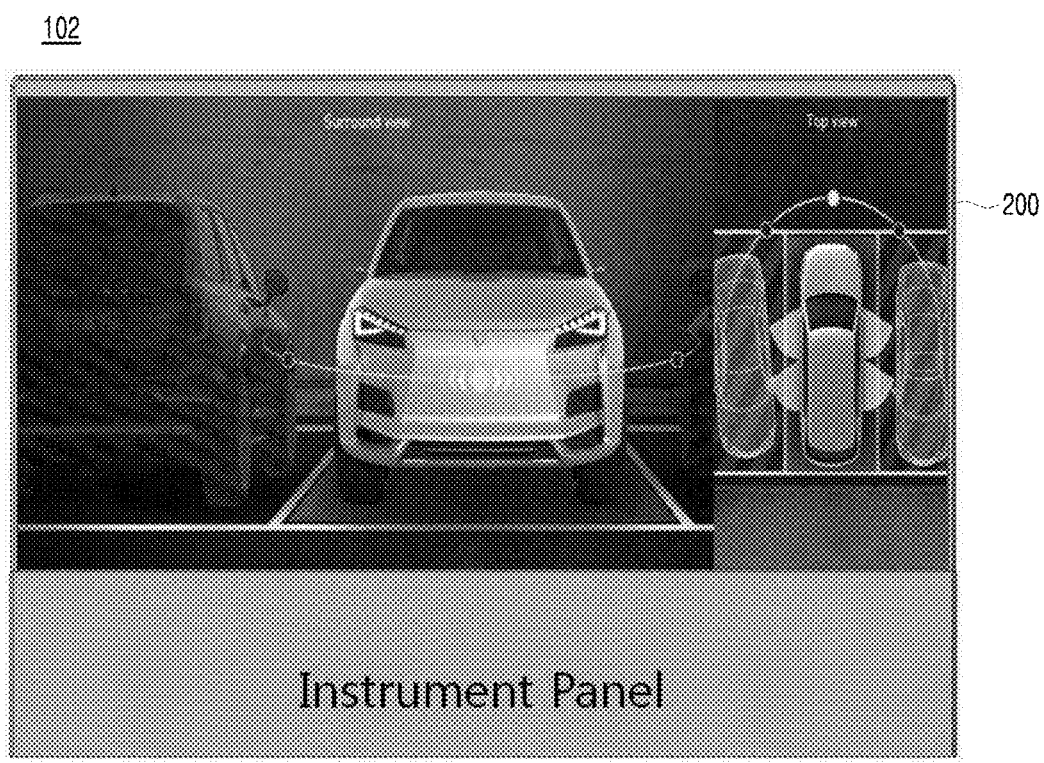

In some examples, as shown in FIG. 7, in the parking mode, the surrounding information obtained through the camera 121 may be displayed on the flexible display 200. In some cases, only the surrounding information of the area that is relatively close to the vehicle 10 may be displayed in an enlarged manner.

During parking of the vehicle 10, the information to which the user pays the greatest attention is information about other vehicles, persons, or objects relatively close to the vehicle 10. Thus, it may be most helpful to the user to only display this information in an enlarged manner.

As described above, in the vehicle display device 102, in response to the screen area of the flexible display 200 being increased to a preset area or greater, surrounding information of the photographed area is displayed on the flexible display 200 at an enlarged aspect ratio. Accordingly, the user may confirm more detailed and concrete information.

In some examples, the vehicle display device 102 may further include a camera 121 capable of capturing an image of the surroundings of the vehicle 10. In response to the screen area of the flexible display 200 being increased to a preset area or greater, the controller 180 may cause surrounding information of a relatively large area photographed by the camera 121 to be displayed on the flexible display 200 at a constant aspect ratio.

Figure 8:

In some examples, as shown in FIG. 8, in the parking mode, the surrounding information obtained through the camera 121 may be displayed on the flexible display 200. For example, surrounding information of a relatively large area around the vehicle 10 may be displayed.

In some cases, during parking of the vehicle 10, the user may desire to confirm not only information on the area close to the vehicle 10 but also information on the area far from the vehicle 10. From this point of view, it may be helpful to display and provide surrounding information of a relatively large area around the vehicle 10 to the user.

As described above, in the vehicle display device 102, in response to the screen area of the flexible display 200 being increased to a preset area or greater, surrounding information of a relatively large area photographed by the camera 121 is displayed on the flexible display 200 at a constant aspect ratio. Accordingly, the user may confirm a large amount and variety of pieces of information on a relatively large area.

Outside of the above descriptions, the main components of the vehicle display device 102 are the same as or similar to those of the vehicle display device 100, and as such duplicate descriptions thereof are omitted.

Figure 9:
FIGS. 9 and 10 are views showing examples of operation of an example vehicle display device.
Figure 10:

FIGS. 9 and 10 are views showing examples of operation of an example vehicle display device.

For example, the vehicle display device 104 may include a sensor 140 that may sense the driving speed of the driving state of the vehicle 10, and a controller 180 that may control the screen area of the flexible display 200 according to the sensed driving speed of the vehicle 10.

In some examples, as shown in FIG. 9, when the driving speed of the vehicle 10 is relatively high, the user may focus on driving of the vehicle 10 as the screen area of the flexible display 200 may be maintained at the smallest area.

In some examples, as shown in FIG. 10, when the driving speed of the vehicle 10 is relatively low, the user may receive a variety of pieces of information as the screen area of the flexible display 200 may be changed.

Therefore, it may be possible to avoid distraction of the user during driving of the vehicle 10, which may cause erroneous manipulation of the driving devices of the vehicle 10 or the occurrence of an accident.

As described above, in the vehicle display device 104, the driving speed of the vehicle 10 is sensed, and the screen area of the flexible display 200 is controlled based on the sensed driving speed. Accordingly, it may be possible to ensure driving safety by changing the screen area of the flexible display 200 according to the driving speed of the vehicle 10.

In the vehicle display device 104, in response to the driving speed of the vehicle 10 being equal to or greater than a preset speed, the controller 180 may cause the screen area of the flexible display 200 to be reduced to the smallest area and cause only selected essential information 20 is displayed on the flexible display 200 at a constant aspect ratio.

In some implementations, when the driving speed of the vehicle 10 is relatively high, the controller 180 may cause the screen area of the flexible display 200 to be reduced so that the user may concentrate on driving of the vehicle 10. For instance, the controller 180 may cause only the essential information 20, which is directly related to driving of the vehicle 10, to be displayed.

As described above, in the vehicle display device 104, in response to the driving speed of the vehicle 10 being equal to or greater than a preset speed, the screen area of the flexible display 200 is reduced to the smallest area, and only selected essential information 20 is displayed on the flexible display 200 at a constant aspect ratio. Accordingly, the user may concentrate only on information directly related to driving of the vehicle 10 in a situation evaluated to be relatively dangerous due to high-speed driving.

In some examples, in the vehicle display device 104, in response to the driving speed of the vehicle 10 is equal to or greater than a preset speed, the controller 180 may perform control such that the screen area of the flexible display 200 is maintained at the current area and only selected essential information 20 is displayed on the flexible display 200 at an enlarged aspect ratio.

In some examples, when the driving speed of the vehicle 10 is relatively high and the user concentrates on driving of the vehicle 10, the controller 180 may cause the screen area of the flexible display 200 to not be reduced and the information that is to be displayed on the flexible display 200 to be restricted to the essential information 20, thereby displaying the essential information 20 in an enlarged manner.

As described above, in the vehicle display device 104, in response to the driving speed of the vehicle 10 is equal to or greater than a preset speed, the screen area of the flexible display 200 is maintained at the current area, and only selected essential information 20 is displayed on the flexible display 200 at an enlarged aspect ratio. Accordingly, the user may more easily confirm information directly related to driving of the vehicle 10 in a situation evaluated to be relatively dangerous due to high-speed driving.

In the vehicle display device 104, in response to the driving speed of the vehicle 10 is below a preset speed, the controller 180 may cause the screen area of the flexible display 200 to be increased and cause additional information 30 to be displayed on the flexible display 200.

In some examples, when the driving speed of the vehicle 10 is relatively low, the controller 180 may cause the screen area of the flexible display 200 to be increased to provide a greater variety of pieces of information to the user so that the user can confirm a variety of pieces of information through the flexible display 200.

As such, in the vehicle display device 104, in response to the driving speed of the vehicle 10 being below a preset speed, the screen area of the flexible display 200 is increased, and additional information 30 is displayed on the flexible display 200. Accordingly, it may be possible to provide a greater variety of pieces of information to the user in a situation evaluated to be relatively safe due to low-speed driving.

In some implementations, the main components of the vehicle display device 104 may be the same as or similar to those of the vehicle display devices 100 and 102, and as such duplicate descriptions thereof are omitted.

Figure 11:
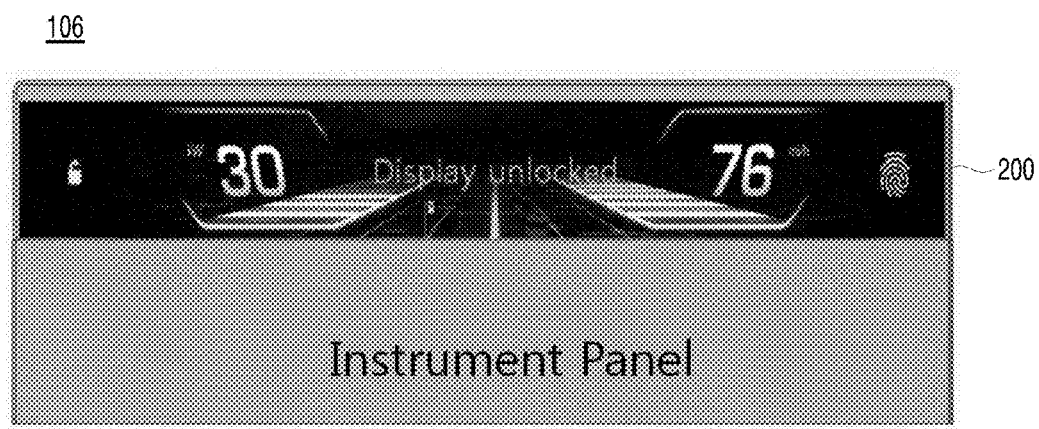
FIGS. 11 to 13 are views showing examples of operation of an example vehicle display device.
Figure 12:
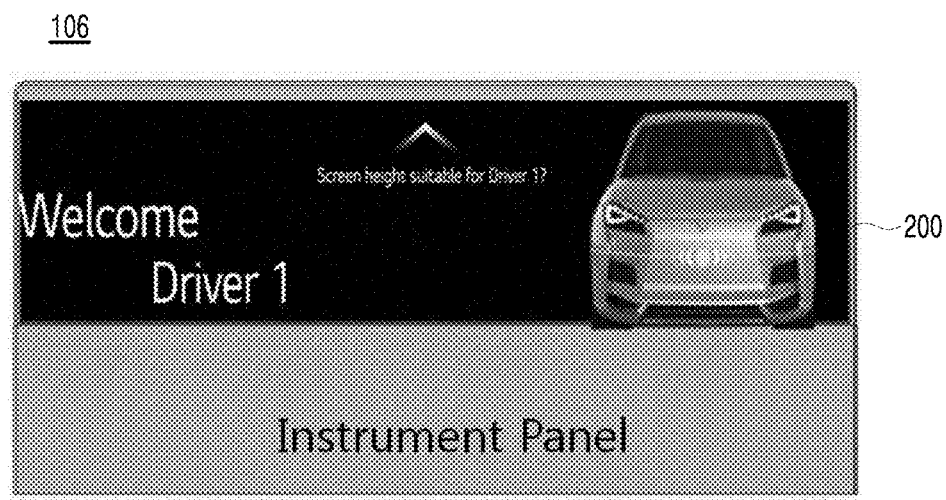
Figure 13:
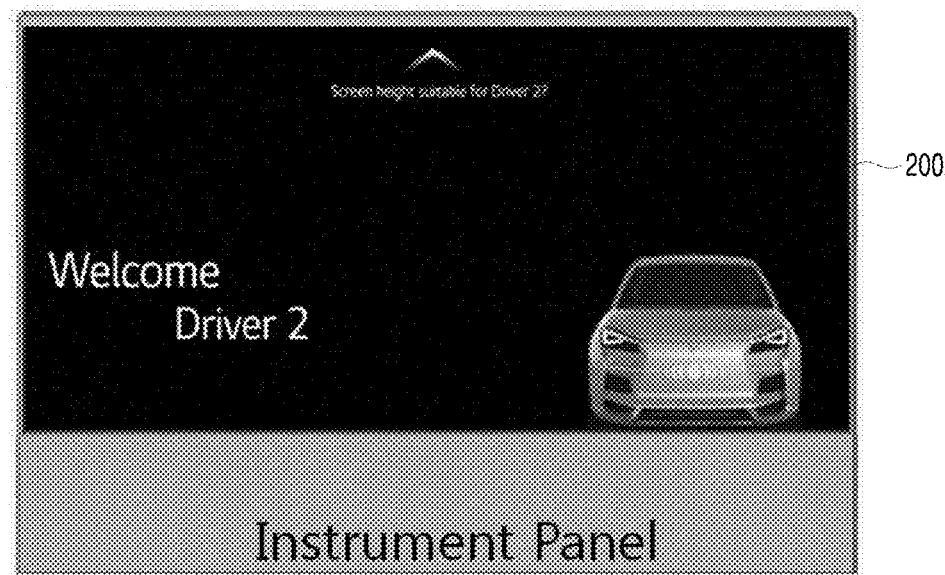

FIGS. 11 to 13 are views showing examples of operation of an example vehicle display device.

For example, the vehicle display device 106 may include a flexible display 200, an input interface 120, an output interface 150, and a controller 180.

The input interface 120 is a part into which the user in the vehicle 10 inputs information. The user may input a signal for operating the vehicle display device 106 or the like through the input interface 120.

The output interface 150 is a part from which information is outputted to the user in the vehicle 10. In addition to the information outputted through the flexible display 200, separate information, such as a sound, a notification mark 50, or vibration, may be outputted through the output interface 150.

The controller 180 controls the operation of the flexible display 200 in response to the information inputted through the input interface 120.

That is, the operation of the flexible display 200 is appropriately adjusted via direct manipulation of the user intending to change the screen area of the flexible display 200.

As described above, in the vehicle display device 106, specific information is inputted through the input interface 120 by the user, and the operation of the flexible display 200 is controlled by the controller 180 based on the inputted information. Accordingly, the operation of the vehicle display device mounted in the vehicle 10 may be optimally controlled based on the specific intention of the user.

The vehicle display device 106 may further include a memory 170 for storing registration information on the user of the vehicle 10. The input interface 120 may receive user information inputted by the user in the vehicle 10, and the controller 180 may determine whether to activate the operation of the flexible display 200 depending on whether the user information matches the registration information.

That is, as shown in FIG. 11, for security reasons or the like, the flexible display 200 may remain in an inactivated state in which the display function thereof is not implemented.

As shown in FIG. 12, when user information is inputted by the user and the user information matches the pre-stored registration information, the flexible display 200 may become activated so as to implement the display function.

As described above, in the vehicle display device 106, whether to activate the operation of the flexible display 200 is determined depending on whether user information matches the registration information. Accordingly, only an authenticated user is allowed to operate the vehicle display device of the vehicle 10.

In the vehicle display device 106, when user information matches the registration information, the controller 180 may control the flexible display 200 such that the screen area of the flexible display 200 is changed to a preset area.

The method of using the vehicle display device 106 may vary depending on the user. For example, one user may prefer a state in which the screen is relatively large and is inclined at a predetermined angle, as shown in FIG. 13. Another user may prefer a state in which the screen is relative small and stands substantially upright, as shown in FIG. 12.

Such individual user preferences may be stored in advance. Therefore, when user information matches the registration information, the screen area of the flexible display 200 may be automatically changed to an area that is preset in association with the registration information and the preference of the corresponding user.

As described above, in the vehicle display device 106, in response to user information matching the registration information, the screen area of the flexible display 200 is changed to a preset area. Accordingly, the flexible display 200 may be optimally controlled so as to be used immediately in response to an authentication process passing without requiring the user to manually operate the device.

In the vehicle display device 106, the memory 170 may store respective pieces of registration information on a plurality of users, and the controller 180 may individually control the flexible display 200 according to each piece of registration information that matches the user information that is inputted.

In some cases, only one user may use the vehicle 10. In many cases, however, a plurality of users may use the vehicle 10.

In some examples, when the multiple users use the vehicle 10, it may be cumbersome for a user to change the flexible display 200 to suit the preferences of the user.

Therefore, in some implementations, the preferences of each user of a plurality of users may be stored in advance, and based on user information matching the registration information, the screen area of the flexible display 200 may be automatically changed to an area that is preset in association with the registration information and the preferences of the corresponding user.

As described above, in the vehicle display device 106, the flexible display 200 may be individually controlled according to each piece of registration information that matches the user information that is inputted. Accordingly, the flexible display 200 may be optimally controlled so as to be used immediately in consideration of the characteristics of each of a plurality of users.

In some implementations, the main components of the vehicle display device 106 are the same as or similar to those of the vehicle display devices 100, 102 and 104, and as such duplicate descriptions thereof will be omitted.

Figure 14:
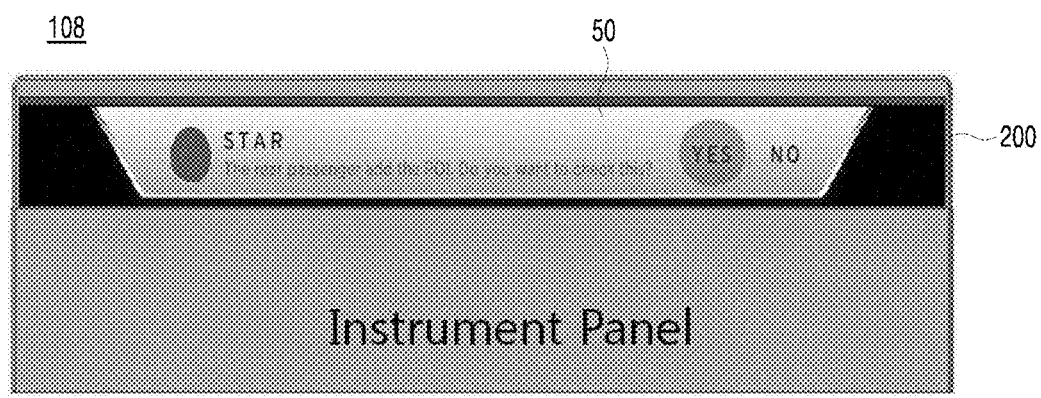
FIGS. 14 and 15 are views showing examples of operation of an example vehicle display device.
Figure 15:
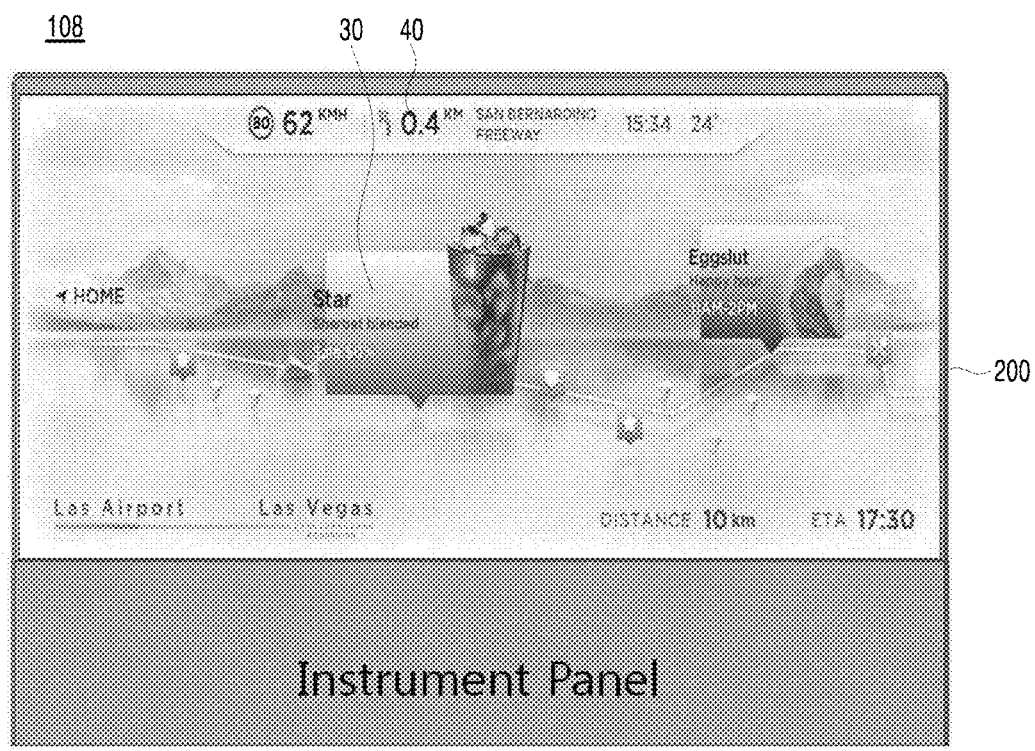

FIGS. 14 and 15 are views showing examples of operation of an example vehicle display device.

In some implementations, the vehicle display device 108 may include an output interface 150 that may be disposed at a portion of the flexible display 200 and configured to output a notification mark 50 to the user in the vehicle 10, an input interface 120 that may receive an authorization signal applied to the notification mark 50 by the user in the vehicle 10, and the controller 180 that may control the display state of information that is outputted during the operation of the flexible display 200 depending on whether an authorization signal has been applied to the notification mark 50.

For example, when the user drives the vehicle 10 in a specific area, information on popular restaurants in the area may be automatically provided to the user. However, immediate provision of such information may distract the attention of the user depending on the state of the user or the driving state of the vehicle 10. Therefore, as shown in FIG. 14, only the notification mark 50 indicating such information may be outputted.

In response to the user, who has recognized the notification mark 50, applying an authorization signal to the notification mark 50 in order to confirm information corresponding thereto, the corresponding information may be displayed on the flexible display 200, as shown in FIG. 15.

In some examples, the information associated with the notification mark 50 may be limited to information on a specific category, such as the main interests of the user, which is preset by the user, and may be continuously updated by, for example, artificial intelligence (AI), in consideration of the preferences of the user.

As described above, in the vehicle display device 108, the display state of information that is outputted through the flexible display 200 is controlled depending on whether the user has applied input of an authorization signal with respect to the notification mark 50 outputted to the user. Accordingly, information to which the user is increasingly likely to pay attention may be more frequently provided to the user.

In the vehicle display device 108, selected information 40, which is selected by the user in the vehicle 10, may be displayed on the flexible display 200, and, in response to the user applying input of an authorization signal with respect to the notification mark 50, the controller 180 may cause the screen area of the flexible display 200 to increase and additional information 30 associated with the notification mark 50 to be additionally displayed in an area other than the area in which the selected information 40 is displayed.

That is, the notification mark 50, which indicates information other than the selected information 40, which is selected by the user so as to be displayed on the flexible display 200, may be outputted, and in response to the user applying input of an authorization signal with respect to the notification mark 50, the additional information 30 associated with the notification mark 50 may be displayed on the flexible display 200.

In some examples, the additional information 30 may be displayed in an area that does not overlap the area in which the selected information 40 is displayed, specifically, in a newly generated area as a consequence of the enlargement of the screen to help the user to avoid confusion of the selected information 40 with the additional information 30.

As described above, in the vehicle display device 108, in response to the user applying input of an authorization signal with respect to the notification mark 50, the screen area of the flexible display 200 is increased, and additional information 30 associated with the notification mark 50 is additionally displayed in an area other than the area in which the selected information 40 is displayed. Accordingly, even when the additional information 30 is displayed, the selected information 40 may be continuously and stably provided to the user.

In some examples, in the vehicle display device 108, the selected information 40, which is selected by the user in the vehicle 10, may be displayed on the flexible display 200, and, in response to the user applying input of an authorization signal with respect to the notification mark 50, the controller 180 may cause the screen area of the flexible display 200 to increase and the additional information 30 associated with the notification mark 50 and the selected information 40 to be rearranged and displayed.

In some implementations, the additional information 30 may be displayed separately from the existing selected information 40. In some cases, however, the visibility of the selected information 40, which has already been displayed, may be degraded due to the increase in the screen area of the flexible display 200.

For example, when the screen area of the flexible display 200 is increased, if the existing selected information 40 is still displayed at the same size as before, it may be difficult to notice the selected information 40 on the entirety of the screen. In some examples, the size or amount of the selected information 40 displayed on the flexible display 200 may be increased according to the increase in the screen area of the flexible display 200.

Accordingly, when additional information 30 is displayed, it may be rearranged together with the existing selected information 40 so that both the selected information 40 and the additional information 30 are optimally outputted on the increased screen area of the flexible display 200.

As described above, in the vehicle display device 108, when the user applies input of an authorization signal with respect to the notification mark 50, the screen area of the flexible display 200 is increased, and additional information 30, associated with the notification mark 50, and the existing selected information 40 are rearranged and displayed. Accordingly, all pieces of information including the additional information 30 may be optimally displayed.

With the exception of the above description, the main components of the vehicle display device 108 are the same as or similar to those of the vehicle display devices 100, 102, 104 and 106, and as such duplicate descriptions thereof are omitted.

Figure 16:
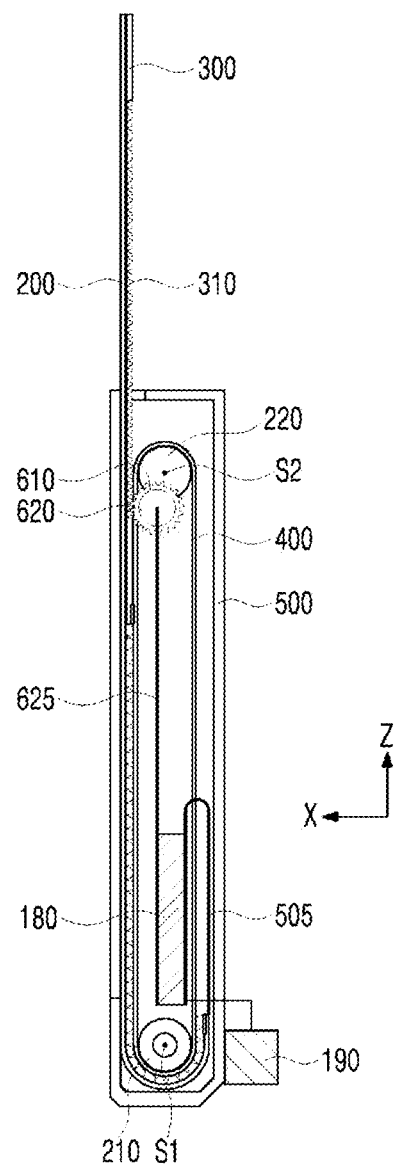
FIG. 16 is a view showing an example structure for changing a screen area of a flexible display of an example vehicle display device.

FIG. 16 is a view showing an example structure for changing a screen area of a flexible display in an example vehicle display device. The structure may be applied to the vehicle display devices described above with respect to FIGS. 1-15.

For example, the vehicle display device 100 may include a first frame 500, a second frame 300, and a flexible display 200.

The flexible display 200 may be configured to be transformed by external force.

The transformation may be at least one of warping, bending, folding, twisting, rolling, and spreading of the display module. The transformable display module may be referred to as a flexible display 200. In some examples, the flexible display 200 may include various types of flexible displays, an electronic paper (e-paper), and any combination thereof.

For instance, a flexible display may be a durable display that may maintain characteristics of existing flat panel displays and that may be manufactured on a thin and flexible substrate which can be warped, bent, folded, twisted, rolled, and spread like paper. The durable display may be light in weight and may not be easily broken.

Further, electronic paper is a display technique to which characteristic of general ink are applied, but uses reflection light, which is different from existing flat panel displays. The electronic paper may change information using a twist ball or electrophoresis using a capsule.

Information displayed on the flexible display 200 may include visual information that is outputted on a curved surface. The visual information is implemented by independently controlling the light emission of unit pixels (sub pixels) disposed in a matrix. A unit pixel refers to a minimum unit which implements one color.

In some cases, a part of the flexible display 200 may be not flat but may be bent. For example, when an external force is applied to the flexible display 200, a part of the flexible display 200 may be deformed into a flat state, or a less bent state or a more bent state.

The flexible display 200 may be combined with a touch sensor to implement a flexible touch screen. When a touch is made on the flexible touch screen, the controller 180 (see FIG. 1) performs control corresponding to the touch input. The flexible touch screen is formed such that the touch input is sensed while a part of the flexible display 200 is spread or bent.

The vehicle display device 100 according to the modified example may include a deformation sensing means or sensor that may sense deformation of the flexible display 200. The deformation sensing means may be included in the sensor 140 (see FIG. 1).

The deformation sensing means may be provided in the flexible display 200 or the first frame 500, and may sense information related to the deformation of the flexible display 200. The information related to the deformation may be such information as information on a deformation direction of the flexible display 200, information on how much the flexible display 200 is deformed, information on the position of the deformation, information on the time of the deformation, and information on an acceleration at which the deformed flexible display 200 is restored. In addition to the above information, various other types of information which can be sensed due to the bending of the flexible display 200 may also be included.

Further, the controller 180 (see FIG. 1) may change information disposed on the flexible display 200 or generate a control signal for controlling a function of the vehicle display device 100, based on the information related to the deformation of the flexible display 200 sensed by the deformation sensing means.

The deformation of the state of the flexible display 200 is not limited to the deformation by the external force. For example, when a part of the flexible display 200 is unfolded, the part may be deformed to be bent by the command of the user or an application.

The first frame 500 may form the overall external appearance of the vehicle display device 100. The first frame 500 may be formed of a relatively solid material. The first frame 500 may be formed of plastic, metal, or a combination thereof. Other components constituting the vehicle display device 100 may be coupled to the first frame 500.

The first frame 500 may be formed in any of various configurations for supporting other components coupled thereto. For example, the first frame 500 may have a rectangular shape overall, and may also have a flat shape overall.

The first frame 500 may be formed to have a flat surface that is perpendicular to a first direction (an X-axis direction). Accordingly, the first frame 500 has a predetermined length in a second direction (a Y-axis direction), which is perpendicular to the first direction, and further has a predetermined length in a third direction (a Z-axis direction), which is perpendicular to the first direction and the second direction.

When the first direction (the X-axis direction) is a direction that is parallel to the forward-backward direction of the vehicle 10, the second direction (the Y-axis direction) may be a direction that is parallel to the leftward-rightward direction of the vehicle 10, and the third direction (the Z-axis direction) may be a direction that is parallel to the upward-downward direction of the vehicle 10.

In some implementations, the forward-backward direction and the leftward-rightward direction may be directions that are parallel or substantially parallel to the horizontal direction, and the upward-downward direction may be a direction that is parallel or substantially parallel to the vertical direction.

The second frame 300 may be formed in a plate shape. The second frame 300 may be formed in a rectangular plate shape.

The second frame 300 may include a flat surface that is perpendicular to the first direction (the X-axis direction). The second frame 300 may be coupled to the first frame 500 so as to perform reciprocating movement in the third direction. The second frame 300 may be coupled to the first frame 500 so as to perform sliding movement.

In response to the second frame 300 reciprocating in the third direction with respect to the first frame 500, the second frame 300 may move within a range of the distance (the stroke) from one end point to the opposite end point. For example, when the third direction is a direction parallel to the upward-downward direction, the second frame 300 may move within the range between a point at which the second frame 300 is located at the lowest position with respect to the first frame 500 and a point at which the second frame 300 is located at the highest position with respect to the first frame 500.

The left edge and the right edge of the first frame 500 may be formed in a shape suitable to guide the smooth movement of the flexible display 200.

To this end, a left guide may be continuously formed on the left edge of the first frame 500 in the third direction, and a right guide may be continuously formed on the right edge of the first frame 500 in the third direction.

The left guide and the right guide may have concave grooves formed therein so as to face each other. Each groove may be formed so as to have a constant cross-section in the third direction.

The left edge of the second frame 300 may be inserted into the groove in the left guide, and the right edge of the second frame 300 may be inserted into the groove in the right guide. Accordingly, the second frame 300 may move in the third direction with respect to the first frame 500.

The flexible display 200 is coupled to the first frame 500 and the second frame 300 in an overall bent state. The flexible display 200 may be overall bent in a "U" shape, or may be overall bent in a "J" shape.

The flexible display 200 is coupled at a portion thereof to the second frame 300. The flexible display 200 is coupled to the front side of the second frame 300 in the first direction.

The portion of the flexible display 200 that is coupled to the second frame 300 moves together with the second frame 300. The overall shape of the flexible display 200 changes in response to the second frame 300 moving with respect to the first frame 500.

A portion of the flexible display 200 is exposed in front of the first frame 500 and the second frame 300 so as to be oriented in the first direction, and the exposed area of the flexible display 200 that is oriented in the first direction is variable.

When the third direction is a direction parallel to the upward-downward direction, the case in which the second frame 300 is located at the lowest position with respect to the first frame 500 corresponds to the state in which the exposed area of the flexible display 200 that is oriented in the first direction is the smallest, and the case in which the second frame 300 is located at the highest position with respect to the first frame 500 corresponds to the state in which the exposed area of the flexible display 200 that is oriented in the first direction is the largest.

In some examples, the vehicle display device 100 may be transformed between the state in which the exposed area of the flexible display 200 that is oriented in the first direction is the smallest (the first state) and the state in which the exposed area of the flexible display 200 that is oriented in the first direction is the largest (the second state). Further, the vehicle display device 100 may be maintained in the first state, the second state, or an arbitrary state between the first state and the second state.

In the vehicle display device 100, the flexible display 200 may include a first area and a second area.

The first area may be an area that overlaps the outer surface of the second frame 300 and is exposed. The first area may be an exposed area of the flexible display 200 when viewed from the front in the first state.

The first area may form a planar surface in the first state and the second state.

The second area may be an area that overlaps the outer surface of a driving track, excluding the first area. The second area may be an area of the flexible display 200 excluding the exposed area of the flexible display 200 corresponding to the first area when viewed from the front in the second state.

The vehicle display device 100 may be configured such that the size of the second area that is exposed together with the first area at the same side as the first area changes according to movement of the second frame 300.

The second area may be configured such that a portion thereof forms a curved surface and the remaining portion thereof forms a planar surface.

In the first state, the portion of the second area that forms a planar surface is located opposite the first area (i.e. is oriented in the opposite X-axis direction).

In some examples, in response to the vehicle display device changing from the first state to the second state, the portion of the second area that forms a curved surface may be transformed into a portion forming the same planar surface as the first area, and the remaining portion of the second area, which is located opposite the first area, may be transformed into the portion forming a curved surface.

In some implementations, the vehicle display device 100 may include a second frame 300 that may be made of a solid material so that the shape thereof may maintained. For instance, the second frame 300 may be made of metal, plastic, or a combination thereof.

In some examples, the second frame may include a first gear 310 having teeth successively formed on the inner surface (the rear surface) of the second frame 300 in the moving direction of the second frame 300. For example, the teeth of the first gear 310 may be successively formed on the inner surface (the surface oriented in the opposite X-axis direction) of the second frame 300 in the upward-downward direction.

In some implementations, the vehicle display device 100 may include an actuator.

For example, the actuator may include a driving gear 610 and a driving motor 620.

The driving gear 610 is coupled to the inner side of the first frame 500 so as to be rotatable about the rotary shaft S3 thereof, and meshes with the first gear 310 of the second frame 300 so as to be rotated together therewith.

The driving motor 620 may be configured as a normal motor which rotates by electric energy, and may be configured as a step motor. The driving motor 620 is directly coupled to the driving gear 610 to rotate the driving gear 610, or may rotate the driving gear 610 by means of another gear. The driving motor 620 may be fixedly coupled to the inner side of the first frame 500.

The driving gear 610 may be located above a first roller 210 in the vehicle display device 100. The driving gear 610 may be disposed so as to be substantially aligned with a second roller 220 in the upward-downward direction.

In the vehicle display device 100, the gear module of each of the gear 310 of the second frame 300 and the driving gear 610 may be 0.3 mm in order to secure smooth movement of the second frame 300.

In the vehicle display device 100, the flexible display 200 and the actuator may be configured to receive power from the vehicle 10, and the power supply 190 for supplying power to the flexible display 200, and the actuator may be provided at one side of the first frame 500. The power supply 190 may be implemented as an electric terminal, an electric connector, or any of various devices for electrically connecting the power source of the vehicle 10 to the vehicle display device 100.

Accordingly, the vehicle display device 100 does not require a separate battery. Electric wires 505 and 625 for supplying power to the flexible display 200 and to the actuator and the controller 180 may be disposed in the space defined by the first area and the second area of the flexible display 200. The electric wires 505 and 625 for supplying power to the flexible display 200 and to the actuator may be formed as a flexible printed circuit board (FPCB).

As such, in the vehicle display device 100, the flexible display 200 and the actuator receive power from the vehicle 10 through the electric wires disposed in the space defined by the first area and the second area of the flexible display 200, and it may be possible to avoid or reduce an increase in the thickness of the vehicle display device 100 due to wiring.

While the foregoing has been given by way of illustrative example of the present disclosure, all such and other modifications and variations thereto as would be apparent to those skilled in the art are deemed to fall within the broad scope and ambit of this disclosure as is herein set forth. Accordingly, such modifications or variations are not to be regarded as a departure from the spirit or scope of the present disclosure, and it is intended that the present disclosure cover the modifications and variations of this disclosure provided they come within the scope of the appended claims and their equivalents.

What is claimed is:

1. A display device for a vehicle, comprising:
    a flexible display configured to be mounted in the vehicle, wherein the display device is configured to extend and retract the flexible display to thereby change a size of a screen area of the flexible display;
    a sensor configured to detect the size of the screen area; and
    a controller configured to, based on the size of the screen area, control a display state of information output through the flexible display.

2. The display device of claim 1, further comprising a non-transitory memory configured to store information to be output through the flexible display,
    wherein the controller is configured to, based on the size of the screen area corresponding to a minimum area, control the flexible display to output first information selected from the information stored in the non-transitory memory.

3. The display device of claim 2, wherein the controller is configured to control the flexible display to output a notification mark associated with second information that is stored in the non-transitory memory and is not displayed in the flexible display.

4. The display device of claim 3, wherein the controller is configured to, based on the size of the screen area being increased, control the flexible display to output the second information stored in the non-transitory memory.

5. A display device for a vehicle, comprising:
    a flexible display configured to be mounted in the vehicle;
    a sensor configured to detect a driving state of the vehicle; and
    a controller configured to control the flexible display to extend and retract to thereby change a size of a screen area of the flexible display based on the driving state.

6. The display device of claim 5, wherein the controller is configured to control the flexible display to increase the size of the screen area to a preset size or greater based on the driving state corresponding to a parking state.

7. The display device of claim 6, wherein the sensor is configured to detect the parking state based on at least one of information input by a user in the vehicle, a traveling direction of the vehicle, a speed of the vehicle, or distribution of vehicles neighboring the vehicle.

8. The display device of claim 7, further comprising a camera configured to capture surrounding information of the vehicle,
    wherein the controller is configured to, based on the size of the screen area being increased to the preset size or greater, control the flexible display to output the surrounding information in an image corresponding to an area photographed by the camera, the image having an enlarged aspect ratio corresponding to the increased size of the screen area.

9. The display device of claim 7, further comprising a camera configured to capture surrounding information of the vehicle,
wherein the controller is configured to, based on the size of the screen area being increased to the preset size or greater, control the flexible display to output the surrounding information in an image corresponding to an area photographed by the camera, the image having a constant aspect ratio across the flexible display.

10. The display device of claim 5, wherein the sensor is configured to detect a driving speed of the vehicle, and
wherein the controller is configured to control the size of the screen area based on the driving speed.

11. The display device of claim 10, wherein the controller is configured to, based on the driving speed being greater than or equal to a preset speed, control the flexible display to reduce the size of the screen area to a minimum area and to output selected information in an image having a constant aspect ratio across the flexible display.

12. The display device of claim 10, wherein the controller is configured to, based on the driving speed being greater than or equal to a preset speed, control the flexible display to maintain the size of the screen area and to output selected information in an image having an enlarged aspect ratio corresponding to the size of the screen area.

13. The display device of claim 10, wherein the controller is configured to, based on the driving speed being less than a preset speed, control the flexible display to increase the size of the screen area to output additional information.

14. A display device for a vehicle, comprising:
a flexible display configured to be mounted in the vehicle, wherein the display device is configured to extend and retract the flexible display to thereby change a size of a screen area of the flexible display;
an input interface configured to receive information input by a user in the vehicle;
an output interface configured to output information to the user in the vehicle; and
a controller configured to control the flexible display based on the information received through the input interface.

15. The display device of claim 14, further comprising a non-transitory memory configured to store registration information of the user of the vehicle,
wherein the input interface is configured to receive user information input by the user in the vehicle, and
wherein the controller is configured to determine whether to activate operation of the flexible display based on a determination whether the user information matches the registration information.

16. The display device of claim 15, wherein the controller is configured to, based on a determination that the user information matches the registration information, control the flexible display to extend and retract to thereby change the size of the screen area to a preset size.

17. The display device of claim 16, wherein the non-transitory memory is configured to store registration information of a plurality of users of the vehicle, and
wherein the controller is configured to control the flexible display according to individual registration information that matches the user information input by the user corresponding to one of the plurality of users.

18. The display device of claim 14, wherein the output interface is disposed at a portion of the flexible display and configured to output a notification mark,
wherein the input interface is configured to receive, from the user, an authorization signal corresponding to the notification mark, and
wherein the controller is configured to control a display state of the information output through the flexible display based on whether the authorization signal is received through the input interface.

19. The display device of claim 18, wherein the flexible display is configured to display, in a first area of the flexible display, information selected by the user in the vehicle, and
wherein the controller is configured to:
in response to receiving the authorization signal corresponding to the notification mark, control the flexible display to increase the size of the screen area, and
output additional information associated with the notification mark in a second area of the flexible display that is different from the first area.

20. The display device of claim 18, wherein the flexible display is configured to display information selected by the user in the vehicle, and
wherein the controller is configured to:
in response to receiving the authorization signal corresponding to the notification mark, control the flexible display to increase the size of the screen area,
rearrange the selected information in the flexible display, and
output additional information associated with the notification mark.

\* \* \* \* \*